United States Patent [19]

Razzano

[11] Patent Number: 4,780,108
[45] Date of Patent: Oct. 25, 1988

[54] METHOD FOR INCREASING BULK DENSITY OF FILLERS

[75] Inventor: John S. Razzano, Cohoes, N.Y.

[73] Assignee: General Electric Company, Waterford, N.Y.

[21] Appl. No.: 157,095

[22] Filed: Feb. 9, 1988

Related U.S. Application Data

[63] Continuation of Ser. No. 641,083, Aug. 15, 1984, abandoned.

[51] Int. Cl.$^4$ .................... C05B 19/00; C04B 14/00; C08K 3/10
[52] U.S. Cl. .................... 23/293 R; 23/313 R; 23/313 AS; 106/308 Q; 106/308 M; 524/860; 523/443; 523/466; 423/335
[58] Field of Search ............ 23/313 R, 313 AS, 314, 23/293 R; 264/117; 106/308 Q, 308 M; 523/443, 446; 524/860, 861; 423/335

[56] References Cited

U.S. PATENT DOCUMENTS

| 2,665,264 | 1/1954 | Brooks | 523/512 |
| 2,928,009 | 5/1960 | Lucas | 524/588 |
| 3,024,126 | 3/1962 | Brown | 106/308 Q |
| 3,368,004 | 2/1968 | Sirianni et al. | 264/117 |
| 3,646,183 | 2/1972 | Topcik | 264/117 |
| 3,824,208 | 7/1974 | Link et al. | 524/588 |
| 3,832,434 | 8/1974 | Flood et al. | 23/313 R |
| 3,844,811 | 10/1974 | Brynko | 23/314 |
| 4,126,422 | 11/1978 | Brandes | 23/313 R |
| 4,211,578 | 7/1980 | Scott | 264/117 |
| 4,433,096 | 2/1984 | Bokermann et al. | 524/861 |
| 4,454,288 | 6/1984 | Lee et al. | 524/860 |
| 4,529,774 | 6/1985 | Evans et al. | 524/860 |

OTHER PUBLICATIONS

Hawley, Condensed Chemical Dictionary 8th Ed. Van Nostrand 1971, p. 784.
McGraw-Hill Encyclopedia of Chemistry N.Y. 1982, p. 941.
Van Nostrand Scientific Encyclopedia 6th Ed. N.Y. 1983.

Primary Examiner—Gary P. Straub

[57] ABSTRACT

There is provided a method for increasing the bulk density of low bulk density materials by intimately admixing a low bulk density material and an organic or organopolysiloxane liquid and thereafter removing substantially all of said organic or organopolysiloxane liquid, for example, by evaporation.

10 Claims, No Drawings

METHOD FOR INCREASING BULK DENSITY OF FILLERS

This application is a continuation of application Ser. No. 641,083, filed 08/15/84, now abandoned.

BACKGROUND OF THE INVENTION

The present invention relates to a method for densifying or compacting fillers or other low bulk density materials. More particularly, the present invention relates to a method for incresing the bulk density of materials having a low bulk density by contacting the low bulk density material with a suitable liquid and thereafter evaporating the liquid so as to provide a more dense material.

Fumed silica is a well known reinforcing agent or filler commonly employed to improve the physical properties of silicone rubber. Basically, fumed silica comprises silicon dioxide particles in extremely finely divided form. The specific surface area typically ranges from about 100 to about 400 square meters per gram. Similarly, the density correspondingly is about 2 to 3 pounds per cubic foot.

Other materials having a low bulk density will be obvious to those skilled in the silicone art as well as many other arts such as organic rubber and the like and includes, for example, fumed alumina, carbon blacks and aerogels such as silica aerogel.

A major disadvantage of such low bulk density materials is that they are relatively expensive to ship and store. A compounder or formulator, for example, who requires large quantities of fillers must pay premium rates for shipping because shipping containers such as rail cars cannot contain large amounts on a weight basis. Moreover, once the compounder or formulator receives such filler he must pay for a suitable storage area such as a warehouse, silo or the like, which cost is, of course, ultimately passed on to the consumer or end-user.

Accordingly, it would be highly desirable to provide a means for increasing the bulk density of fillers and other low bulk density materials in order to reduce transportation and storage costs.

There are many mechanical means whereby the bulk density of a powdered material such as fumed silica is increased. One such device for densifying and granulating powdered materials is disclosed in Oldham et al., U.S. Pat. No. 3,114,930. Oldham et al. relies on the use of a vacuum to remove air from an aerated powdered material thereby reducing the density.

Carter, U.S. Pat. No. 3,664,385, compacts finely divided particulate matter by utilizing a rotating screw feeder whereas Leon et al. solve the problem of densification by employing a pair of opposed gas-permeable belts arranged to either side of a common axis so as to define a generally convergent densifying zone between their adjacent faces.

Other examples of mechanical densifying devices include Loffer, U.S. Pat. No. 3,632,247, Kongsgaarden, U.S. Pat. No. 4,126,423, and Kratel, U.S. Pat. No. 4,326,852.

While the bulk density of many materials can be increased by mechanical means, there nevertheless remains certain shortcomings and disadvantages. For example, in the case of fumed silica, if the density is increased by a mechanical apparatus beyond about 6 pounds per cubic foot, unacceptably high amounts of agglomerates and grit are formed. Moreover, it has also been found that such fumed silica no longer disperses as well in silicone polymer as the lower bulk density fumed silica.

It is also known that carbon black can be densified with water to produce a high bulk density material, however, such material has excessive grit therein and is not very effective as a reinforcing agent when compounded into silicone sealant and rubber formulations.

Fitzgerald et al. in U.S. patent application Ser. No. 539,587, filed Oct. 6, 1983, and assigned to the same assignee as the present invention provides an excellent nonmechanical solution to the foregoing problem by blending the fumed silica or other powdered material with a silicone polymer so as to provide free flowing powders having higher densities than can be obtained by mechanical means.

Lucas, U.S. Pat. No. 2,938,009, discloses that certain materials such as fumed silica can be treated with cyclic alkyl polysiloxanes to reduce structuring in curable organopolysiloxane compositions. In carrying out the treating process, it is desirable that the cyclic alkyl polysiloxane employed be sufficiently volatile so that at reasonable temperatures, for instance from 150° to 350° C., volatilization of the cyclic polysiloxane readily takes place so as to diffuse the polysiloxane through the silica particles. One method for obtaining treated filler is said to involve intimately contacting the filler with cyclic alkyl polysiloxanes in an amount ranging from 5 to 50% by weight of cyclic polysiloxane based on the weight of the filler being treated.

Lucas further teaches that treatment of fillers by his process leaves the bulk density of the treated filler essentially unchanged from the bulk density of the intitial untreated filler. Moreover, according to Lucas, this is in direct contrast with the results that are usually obtained by treating the filler with an organosilicon compound described in the prior art, for example, U.S. Pat. No. 2,665,264, where, in some instances the bulk density is less than half of the bulk density of the original untreated filler.

Those skilled in the art will appreciate that the process of Lucas is based on heating the filler/cyclopolysiloxane mixture in order to effect diffusion of the cyclopolysiloxane through the filler, that is, treatment of the filler depends upon the interaction of a gaseous reactant with a solid reactant.

The present applicant has surprisingly found that the interaction between a powdered material such as fumed silica and an organic or organosiloxane liquid, such as a cyclopolysiloxane as well as many other materials which preferably are non-polar or only slightly polar, and thereafter evaporating such liquid causes a substantial increase in the bulk density of the powdered material without causing unacceptably high amounts of agglomerates and grit.

SUMMARY OF THE INVENTION

It is one object of the present invention to provide a method for increasing the bulk density of a low bulk density material.

It is another object of the present invention to provide a method for increasing the bulk density of a low bulk density material without forming unacceptably high amounts of agglomerates and grit.

Still another object of the present invention is to provide a method for increasing the bulk density of a low bulk density material thus enabling the material to be more easily blended into a base compound such as a polymer.

In accordance with the present invention there is provided a method for increasing the bulk density of low bulk density materials, comprising:
(A) adding to a suitable mixing vessel:
  (1) a low bulk density material, and
  (2) an amount of organic or organosiloxane liquid effective for densifying said low bulk density material;
(B) mixing said low bulk density material and said organic or organosiloxane liquid for an amount of time effective to decrease the volume of the original low bulk density material; and
(C) removing substantially all of said liquid so as to provide a material having an increased bulk density.

In a particularly preferred embodiment the low bulk density material is fumed silica and the liquid is octamethylcyclotetrasiloxane.

In a somewhat less preferred embodiment the liquid is a non-polar or low polarity liquid selected from the group consisting of 1,1,1-trichloroethane, toluene, hexane, xylene, mineral spirits, dibutyl ether, isopropanol, 2-ethylhexanol, methyl ethyl ketone, nitrobenzene and chlorobenzene.

DESCRIPTION OF THE INVENTION

The present invention provides a method for increasing the bulk density of low bulk density materials, comprising:
(A) adding to a suitable mixing vessel:
  (1) a low bulk density material, and
  (2) an amount of organic or organosiloxane liquid effective for densifying said low bulk density material;
(B) mixing said low bulk density material and said organic or organosiloxane liquid for an amount of time effective to decrease the volume of the original low bulk density material; and
(C) removing substantially all of said organic or organosiloxane liquid so as to provide a material having an increased bulk density.

In general, the low bulk density material can be any composition which can be generally classified as a "powder". For purposes of the present invention, powder is defined as any solid, dry material of extremely small particle size ranging down to colloidal dimensions, prepared either by comminuting larger units (mechanical grinding), by combustion (e.g. fumed silica), or by precipitation from a chemical reaction (see The Condensed Chemical Dictionary, Tenth Edition, G. G. Hawley, Van Nostrand Reinhold Company, 1981).

Examples of powders which can be employed in the practice of the present invention are fumed silica, carbon blacks, fumed alumina and aerogels.

Of particular interest is fumed silica, which is the most preferred low bulk density material for use in practicing the present invention. For convenience, hereinafter fumed silica will be understood to include any materials within the foregoing definition of a powder.

Liquids which can be mixed with the aforementioned low bulk density materials in order to effect the advantageous results of the present invention may be polar or non-polar. The preferred liquids are non-polar or low polarity liquids and the most preferred liquids are non-polar liquids such as octamethylcyclotetrasiloxane. Included within the definition of such organopolysiloxanes are alkylpolysiloxanes in general, it not being critical that the organo groups be methyl, though methyl groups are preferred.

Examples of suitable liquids for use in practicing the present invention are:

Non-polar octamethylcyclotetrasiloxane
decamethylcyclopentasiloxane
octamethyltrisiloxane
decamethyltetrasiloxane
toluene
xylene
hexanes
octanes
decanes
mineral spirirts

Low polarity 1,1,1-trichloroethane
chlorobenzene
nitrobenzene
dibutylether
methyl ethyl ketone

Polar isopropanol
butanol
2-ethylhexanol

Those skilled in the art will appreciate that many other powders and liquids not specifically listed herein can be utilized to practice the present invention without departing from the intended scope of the appended claims.

In practicing the invention, the low bulk density material is placed in a suitable mixing vessel along with an amount of liquid effective for densifying the low bulk density material. Preferably the liquid is added by spraying it onto the filler while it is being turbulently mixed. By "an effective amount of liquid" is meant an amount of liquid sufficient to decrease the volume of the original low bulk density material. What constitutes an effective amount of liquid will, of course, vary depending upon the low bulk density material, the liquid employed and the intensity of the mixing of the filler and liquid. Those skilled in the art will, however, be able to make such determination without undue experimentation.

As a general guideline, the minimum amount of liquid which can be employed must be sufficient to "wet" or contact substantially all of the particles of powdered material, thereby causing the volume of the powdered material to decrease upon mixing. The maximum amount of liquid desired is that which is sufficient to show that excess liquid is present after mixing. There is, however, no upper bound since the liquid is removed, for example by evaporation, after mixing of the powder and liquid is completed. With particular reference to a mixture of fumed silica and octamethylcyclotetrasiloxane, there should be present at least about 15% by weight, and more preferably at least about 60% by weight, octamethylcyclotetrasiloxane based on the weight of fumed silica. As can be gathered from the example set forth hereinbelow, an effective amount of liquid may be as much as three times, by weight, liquid as fumed silica.

Mixing of the low bulk density material and organic or organosiloxane liquid is preferably effected in a mixing vessel which provides intense agitation such as a mixer or blender so as to insure that substantially all of the particulate matter is wetted with the liquid. However, for purposes of the present invention the terms "mixing vessel" or "mixing in a suitable vessel" and other comparable terminology is intended to include any means which effects wetting of the powder by liquid. For example, methods such as rolling, spraying, fluidizing and agitating are all acceptable equivalents for practicing the present invention. The skilled artisan will also appreciate that the present process can be practiced in either a batch or continuous manner.

The time required to effect mixing must be sufficient to decrease the volume of the original low bulk density material. Accordingly, the mixing time may range from as little as 5 or 10 seconds to an hour or more. The mixing time will, of course, depend upon the particular low bulk density material, the liquid utilized in practicing the invention, the intensity of mixing and the amount of liquid employed. One having ordinary skill in the art will be able to determine what constitutes an effective mixing time without undue experimentation.

If, after mixing, the volume of the initial low bulk density material has not substantially changed, it is necessary merely to add additional liquid and continue mixing for a second period of time. Such process can be continued until the desired decrease in volume of the original low bulk density material is achieved.

Moreover, in some instances it may be advantageous to proceed in a stepwise manner as the liquid will subsequently be removed by evaporation. As can easily be appreciated, if less liquid is present, less energy will be required to evaporate the liquid.

It should be understood that the present invention is not limited to densifying materials which have not been subjected to any other densification process. For example, it is within the intended scope of the present invention to further densify, for example, fumed silica which has previously been partially densified by mechanical or other means.

After the low density bulk material has been mixed with a liquid for a time effective to decrease the volume of the low bulk density material, the liquid is removed from the mixture. Typically, removal of the liquid from the mixture will be achieved merely by evaporation. However, depending upon the particular powder and liquid, it may be desirable to effect evaporation of the liquid at a reduced pressure or to first remove the bulk of the liquid by filtration. Other methods for removing the liquid from the powder will be obvious to the skilled artisan, however, evaporation is the most preferred means for removing the liquid.

The time required to remove substantially all of the liquid from the powder will depend primarily on the liquid employed and the size of the batch prepared. Completion of the drying step can easily be determined by inspecting every few minutes the powder being dried or, more conveniently, merely allowing the drying time to continue for an extended period such as an hour in the case of a small batch or overnight in the case of a large batch. Of course, liquid removal is effected much more quickly when the liquid has a low boiling temperature and the liquid/filler mixture is turbulently agitated in the presence of a purge gas such as nitrogen. On the other hand, the process of the present invention occurs more slowly with a high temperature boiling liquid, where the process temperatures are relatively low, where there is no purge gas, and where agitation of the filler/liquid mixture is minimal.

Densification of low bulk density materials in accordance with the present invention provides materials, especially fillers such as fumed silica which have a substantially greater bulk density, which do not contain unacceptable amounts of agglomerates and grit, and which are readily mixed into other materials, for example, silicone polymer used in making room temperatures vulcanizable (RTV) compositions.

In order to enable the artisan to better understand the present invention the following examples are provided by way of illustration and are not intended to be limiting in any manner. All parts are by weight unless otherwise noted.

EXAMPLE

Into a one gallon Waring® blender containing 44 grams of fumed silica having a density of 2.2 pounds per cubic foot, there was sprayed 132 grams of liquid octamethylcyclotetrasiloxane. The two constituents were intensely mixed for about one minute. The volume occupied by the wetted fumed silica was about one third the volume of the original unwetted filler.

The sample was then placed in an oven for two hours at 200° C., with occasional stirring, in order to evaporate all of the liquid. The bulk density of the fumed silica filler was determined to now 8.5 pounds per cubic foot.

This filler was then chemically treated at 270° C. with octamethylcyclotetrasiloxane according to Lucas, U.S. Pat. No. 2,938,009, which patent's disclosure is incorporated herein by reference, and subsequently added to a room temperature vulcanizable silicone sealant composition. Dispersion of the filler in the RTV sealant formulation was as good as the same sealant made from the same fumed silica without densification in accordance with the present invention.

I claim:

1. A method for increasing the bulk density of fumed silica comprising:
    (A) adding to a suitable mixing vessel:
        (1) a low bulk density fumed silica, and
        (2) at least 60% by weight based on the weight of (1) of organopolysiloxane liquid effective for densifying said low bulk density material;
    (B) mixing said low bulk density material and said organopolysiloxane liquid for an amount of time effective to decrease the volume of said low bulk density material; and
    (C) removing substantially all of said organopolysiloxane liquid from said low bulk density material so as to provide a material substantially free of agglomerates and grit and having an increased bulk density.

2. The method of claim 1 wherein the organopolysiloxane liquid is a non-polar liquid.

3. The method of claim 1 wherein the organopolysiloxane liquid is selected from the group consisting of octamethylcyclotetrasiloxane, decamethylcyclopentasiloxane, octamethyltrisiloxane and decamethyltetrasiloxane.

4. The method of claim 1 wherein organopolysiloxane liquid is octamethylcyclotetrasiloxane.

5. The method of claim 1 wherein in step (A) the organopolysiloxane liquid is added to the mixing vessel by spraying while the low bulk density material is turbulently mixed.

6. The method of claim 1 wherein the low bulk density fumed silica was previously partially densified.

7. The method of claim 6 wherein partial densification was effected by mechanical means.

8. The method of claim 1 wherein removal of substantially all of the organopolysiloxane liquid is effected by evaporation.

9. A method for increasing the bulk density of fumed silica, comprising:

(A) adding to a suitable mixing vessel:
  (1) 100 parts by weight fumed silica and
  (2) at least 60 parts by weight octamethylcyclotetrasiloxane;

(B) mixing said fumed silica and said octamethylcyclotetrasiloxane for about one minute; and (C) evaporating substantially all of said octamethylcyclotetrasiloxane so as to provide fumed silica having an increased bulk density.

10. The method of claim 9, further comprising after step (C), treating said fumed silica with octamethylcyclotetrasiloxane by heating at a temperature of at least 250° C.

* * * * *